United States Patent
Hong et al.

(10) Patent No.: US 9,934,371 B2
(45) Date of Patent: Apr. 3, 2018

(54) FINGERPRINT RECOGNITION METHOD AND ELECTRONIC DEVICE PERFORMING THEREOF

(71) Applicant: Samsung Electronics Co., Ltd., Suwon-si, Gyeonggi-do (KR)

(72) Inventors: Hyun Ju Hong, Hwaseong-si (KR); Hyung Jin Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 14/708,734

(22) Filed: May 11, 2015

(65) Prior Publication Data
US 2015/0324569 A1    Nov. 12, 2015

(30) Foreign Application Priority Data
May 12, 2014 (KR) .......................... 10-2014-0056282

(51) Int. Cl.
*G06F 21/32* (2013.01)
*G06K 9/00* (2006.01)
(Continued)

(52) U.S. Cl.
CPC ............ *G06F 21/32* (2013.01); *G06F 1/1652* (2013.01); *G06F 3/044* (2013.01); *G06F 3/0412* (2013.01); *G06K 9/001* (2013.01); *G06K 9/0002* (2013.01); *G06K 9/0008* (2013.01); *G06K 9/00026* (2013.01); *G06K 9/00073* (2013.01);
(Continued)

(58) Field of Classification Search
CPC ...... G06F 3/044; G06F 3/0416; G06F 3/0412; G06F 3/0414; G06F 3/047; G06F 2203/04103; G06F 3/0418; G06F 3/045
See application file for complete search history.

(56) References Cited

U.S. PATENT DOCUMENTS

| 5,828,773 A * | 10/1998 | Setlak | G06K 9/0002 382/126 |
| 7,050,835 B2 | 5/2006 | Hack et al. | |

(Continued)

FOREIGN PATENT DOCUMENTS

| EP | 2 128 817 A1 | 12/2009 |
| KR | 10-2010-0012044 A | 2/2010 |

OTHER PUBLICATIONS

Yong-Liang Zhang et al, A Hybrid Swipe Fingerprint Mosaicing Scheme, Audio-and Video-Based Biometric Person Authentication; [Lecture Notes in Computer Science;;LNCS], Springer-Verlag, Berlin/Heidelberg, Jun. 28, 2005, pp. 131-140, XP019013265, ISBN: 978-3-540-27887-0 *sections 1-6* *figures 1-4*.

*Primary Examiner* — Olga Merkoulova
(74) *Attorney, Agent, or Firm* — Jefferson IP Law, LLP

(57) ABSTRACT

A fingerprint recognition method and electronic device performing the same are provided. The electronic device includes a fingerprint sensor configured to perform fingerprint sensing according to a control signal of a processor, and includes the processor configured to obtain a fingerprint-unrecognizable position from a sensing area of the fingerprint sensor, to obtain, based on the fingerprint-unrecognizable position, a distance to a fingerprint from the fingerprint-unrecognizable position, and to control, based on the distance, the fingerprint sensor by adjusting a sensing operation of the fingerprint sensor.

21 Claims, 17 Drawing Sheets

(51) Int. Cl.
*G06F 3/044* (2006.01)
*G06F 3/041* (2006.01)
*G06F 1/16* (2006.01)

(52) U.S. Cl.
CPC ............ *G06K 9/00093* (2013.01); *G06F 2203/04102* (2013.01); *G06F 2203/04104* (2013.01); *G06F 2203/04112* (2013.01); *G06K 9/00067* (2013.01); *G06K 2209/05* (2013.01)

(56) References Cited

U.S. PATENT DOCUMENTS

| | | |
|---|---|---|
| 2003/0109286 A1 | 6/2003 | Hack et al. |
| 2003/0144034 A1 | 7/2003 | Hack et al. |
| 2009/0279742 A1 | 11/2009 | Abiko |
| 2013/0215011 A1* | 8/2013 | Ke ............................ G06F 3/03 345/156 |
| 2013/0257775 A1* | 10/2013 | Lee ....................... G06F 3/0416 345/173 |
| 2013/0263252 A1* | 10/2013 | Lien ........................ G06F 21/32 726/19 |
| 2013/0279770 A1* | 10/2013 | Abe ................... G06K 9/00087 382/124 |
| 2015/0198699 A1* | 7/2015 | Kuo .................... G01S 7/52017 367/7 |

\* cited by examiner

FIG.5A
FIG.5B
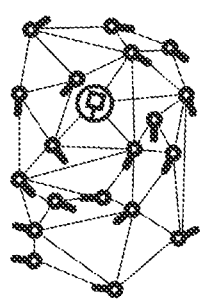
FIG.5C
```
0101010001101000011010
0101110011001000000110
1001011100110010000001
1011100110111101110100
0010000001100001011000
1101110100011101010110
0001011011000110110001
1110010010000001100110
0110100101101110011001
1101100101011100100111
0000011100100110100101
1011100110100000100000
0110010001100001011101
0001100001001010011010
```
FIG.5D

FINGERPRINT RECOGNITION METHOD AND ELECTRONIC DEVICE PERFORMING THEREOF

CROSS-REFERENCE TO RELATED APPLICATION(S)

This application claims the benefit under 35 U.S.C. § 119(a) of a Korean patent application filed on May 12, 2014 in the Korean Intellectual Property Office and assigned Serial number 10-2014-0056282, the entire disclosure of which is hereby incorporated by reference.

TECHNICAL FIELD

The present disclosure relates to a fingerprint recognition method and electronic device performing thereof.

BACKGROUND

As the use of laptop computers and portable terminals such as smart phones increases, so does the importance of information security. Accordingly, many efforts have been made to reinforce security by applying diverse biometric technologies to these portable terminals. Among diverse biometric technologies, fingerprint recognition is widely used because security can be increased at a relatively low cost and the size of a fingerprint sensor can be relatively small.

A fingerprint sensor may be equipped at a front side or a backside of a portable terminal, or provided in a form of key or button which includes the fingerprint sensor. Furthermore, it is possible to provide the fingerprint sensor in a form of a display panel.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a fingerprint recognition sensor and an electronic device performing thereof. Technical subjects according to various embodiments of the present disclosure may not be restrictive to the aforementioned and may be present in other configurations.

In accordance with an aspect of the present disclosure, a fingerprint recognition method is provided. The fingerprint recognition method includes obtaining a fingerprint-unrecognizable position from a sensing area of a fingerprint sensor, obtaining a distance to the fingerprint from the fingerprint-unrecognizable position on the sensing area, and adjusting, based on the distance, a sensing operation of the fingerprint sensor.

In accordance with an aspect of the present disclosure, an electronic device is provided. The electronic device includes a fingerprint sensor configured to perform a fingerprint sensing according to a control signal of a processor, and the processor configured to obtain a fingerprint-unrecognizable position from a sensing area of the fingerprint sensor, to obtain, based on the fingerprint-unrecognizable position, a distance to a fingerprint from the fingerprint-unrecognizable position, and to control, based on the distance, the fingerprint sensor by adjusting a sensing operation of the fingerprint sensor.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A, 5B, 5C and 5D are diagrams illustrating an operation of performing fingerprint authentication in an electronic device according to various embodiments of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, a part of elements shown in the attached drawings may be exaggerated, omitted, or schematically illustrated. As the sizes respective to elements may not be always identical to their practical dimensions, these relative sizes or distances may not act to limit the descriptions hereinafter.

FIGS. 1 through 17, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Figure 1A:
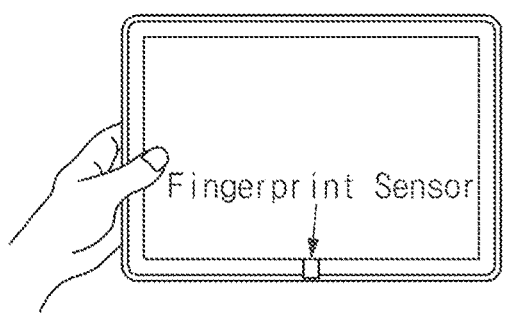
FIGS. 1A and 1B are diagrams illustrating an electronic device capable of being equipped with a fingerprint sensor in according to various embodiments of the present disclosure.
Figure 1B:
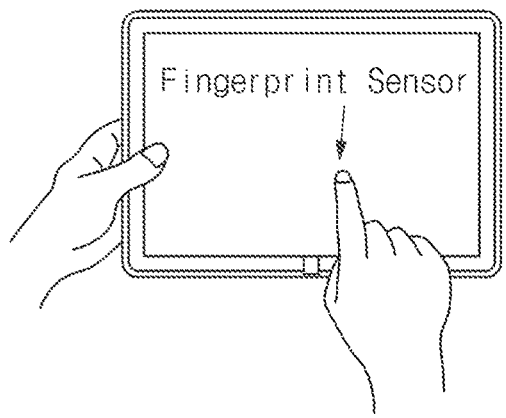

FIGS. 1A and 1B are diagrams illustrating an electronic device capable of being equipped with a fingerprint sensor according to various embodiments of the present disclosure.

Referring to FIG. 1A, a fingerprint sensor is illustrated, where the fingerprint sensor may be provided in a form that is equipped in a key or button, such as a home key.

Referring to FIG. 1B, a fingerprint sensor is illustrated, where the fingerprint sensor may be provided in a form that is equipped in a display panel or in a touch panel, such as a unitary body of a display.

A fingerprint sensor may be also equipped, in addition to the aforementioned positional features, in a front, side, or a back part of an electronic device.

FIGS. 2A, 2B, 2C, 2D and 2E are diagrams illustrating circumstances where fingerprint sensors including curves recognize fingerprints according to various embodiments of the present disclosure. These curves may comprise a curved sensing area and may include all of various uneven types as well as slope, curve, asymmetrical, and the like.

Figure 2A:
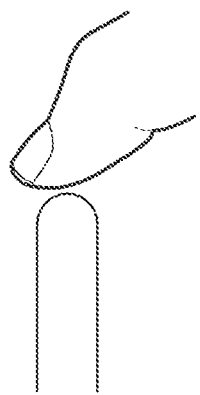
FIGS. 2A, 2B, 2C, 2D and 2E are diagrams illustrating circumstances where fingerprint sensors including curves recognize fingerprints according to various embodiments of the present disclosure.
Figure 2B:
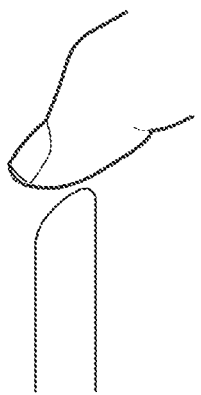
Figure 2C:
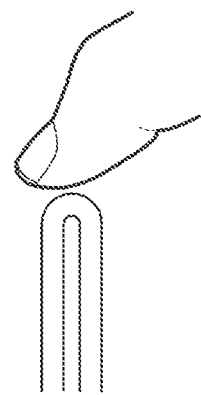

Referring to FIGS. 2A to 2C, an operation of inputting a fingerprint into a curved sensing area by a user is illustrated.

In various embodiments, if a terminal has a flexible display, various areas of the flexible display may be used for the sensing area.

A fingerprint sensor may perform fingerprint recognition if it detects an object (e.g., a human finger) through a sensing area. The sensing area may be an area from which a fingerprint sensor obtains a fingerprint input.

A user may place their fingerprint on a fingerprint sensor, as shown in FIGS. 2A to 2C, to detect a fingerprint. The features shown FIGS. 2A to 2C are exemplarily shown without restriction to various embodiments of the present disclosure. For descriptive convenience, the curved type shown in FIG. 2A will be primarily described hereinafter.

Figure 2D:
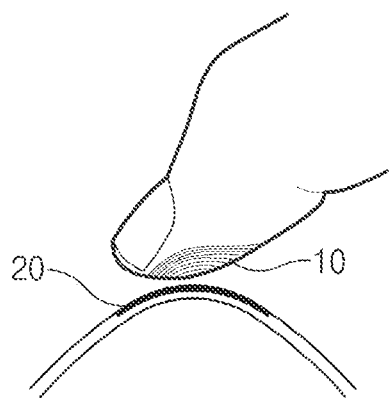

Referring to FIG. 2D, an operation of recognizing a fingerprint through a curved sensing area 20 is illustrated.

Specifically, the sensing area 20 may be placed on a curved area of a terminal. A user may position a fingerprint 10 on the sensing area 20 to perform fingerprint recognition. The curve of the sensing area 20 may cause an irregularity of distances between the fingerprint 10 and the sensing area 20.

Accordingly, the fingerprint sensor may have difficulty in recognizing an image from a part of the fingerprint 10. For example, if an obtained fingerprint image is distorted or indistinct, the fingerprint sensor may not recognize the fingerprint 10. As the distance between the fingerprint 10 and the sensing area 20 becomes larger and, in the curved area as shown in FIG. 2D, as the fingerprint 10 moves distant from the center of the curved area toward both ends thereof, an obtained fingerprint image may be distorted or indistinct.

Figure 2E:
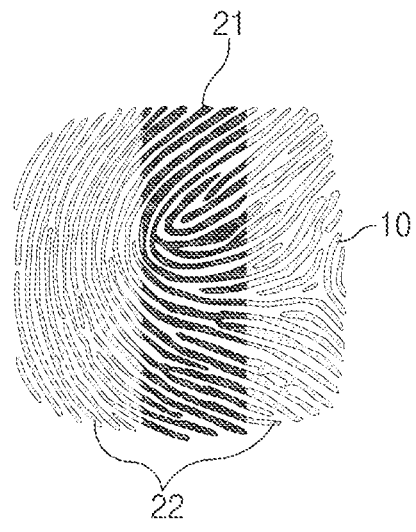

Referring to FIG. 2E, an area 22 where a fingerprint image is distorted or indistinct due to a curve of the sensing area 20 is illustrated.

Specifically, a fingerprint 10 recognized through the center of the curved sensing area 20 may form a distinct image 21 without distortion. On the other hand, a fingerprint 10 recognized through both ends of the curved sensing area 20 may form a distorted or indistinct image on the area 22.

In other words, while it may be permissible to obtain a fingerprint input with distinct image in the sensing area 20 which is close to a finger, it may be inclined to obtain a distorted or indistinct image of the fingerprint 10 as a distance between the sensing area 20 and a finger becomes larger.

Accordingly, when recognizing the fingerprint 10 through the curved sensing area 20, a fingerprint sensor may have difficulty obtaining a sufficiently distinct pattern of fingerprint input which is needed to complete fingerprint recognition.

An electronic device according to various embodiments of the present disclosure may be designed to perform fingerprint recognition by obtaining and compensating a position, at which the fingerprint 10 is input with distortion or indistinctness due to a curve of the sensing area 20, even when the fingerprint 10 is placed on the curved sensing area 20. Hereinafter, for descriptive convenience, a position or area 22, at which the fingerprint 10 is input with distortion or indistinctness, will be referred to as an "unrecognizable area" for the fingerprint 10.

Figure 3:
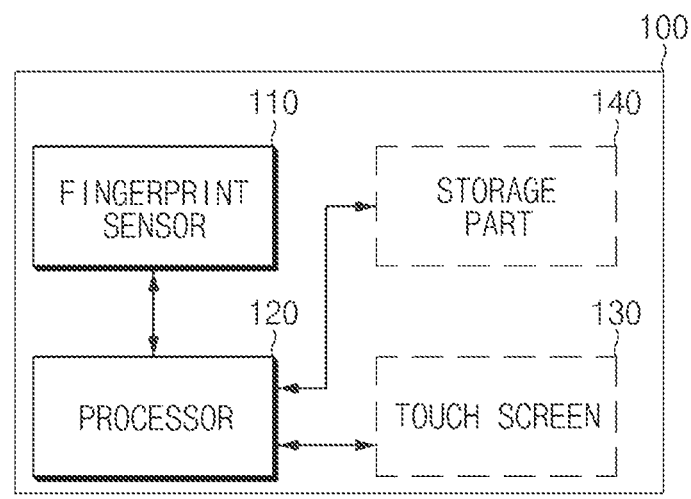
FIG. 3 is a block diagram illustrating an electronic device according to an embodiment of the present disclosure.

FIG. 3 is a block diagram illustrating an electronic device according to an embodiment of the present disclosure.

Referring to FIG. 3, an electronic device 100 is illustrated, where the electronic device 100 may include a fingerprint sensor 110 and a processor 120. According to various embodiments of the present disclosure, the electronic device 100 may further include a touch screen 130 and/or a storage part 140.

The electronic device 100 according to an embodiment of the present disclosure may recognize a fingerprint by controlling an operation of the fingerprint sensor 110 in accordance with a distance between the fingerprint and a sensing area if an image of the fingerprint is distorted or indistinct due to a curve of the sensing area. Such a curved sensing area practiced in the present specification may include all of uneven types as well as slope, curved, or asymmetrical types. Therefore, an embodiment of the present disclosure may be applicable to all kinds of fingerprint sensors and electronic devices having uneven sensing area.

The electronic device 100 according to an embodiment of the present disclosure may be any one of electronic devices such as a mobile phone, a smart phone, a laptop computer, a digital multimedia broadcasting terminal, a digital camera, a portable gaming terminal, a personal digital assistant (PDA), a navigation terminal, a tablet computer, a personal computer, and the like. The electronic device 100 may include an information communication unit, a multimedia unit, and an application unit.

The fingerprint sensor 110 may detect a fingerprint in response to a control signal of the processor 120. The electronic device 100 according to an embodiment of the present disclosure may employ the fingerprint sensor 110 which is operable in an optical, radio-frequency, thermosensitive, and/or ultrasonic mode. Additionally, the electronic device 100 may employ a kind of the fingerprint sensor 110 which is combined with two or more recognition modes.

The fingerprint sensor 110 may be classified into swipe and touch types in accordance with fingerprint sensing style. The fingerprint sensor 110 of the swipe type may recognize a gesture that a finger with a fingerprint by surface is positioned on the fingerprint sensor 110 and then swiped toward a predetermined direction. The fingerprint sensor 110 of the touch type may recognize a gesture that a finger with fingerprint by surface contacts on the fingerprint sensor 110 for a predetermined time. Hereinafter, for descriptive convenience, the description will focus on the fingerprint sensor 110 of the touch type. However, the present disclosure may not be restrictively embodied herein and may be also applicable to the fingerprint sensor 110 of the swipe type.

The fingerprint sensor 110 may transfer sensor data, which is obtained through fingerprint detection, to the processor 120.

The fingerprint sensor 110 may recognize a fingerprint based on a fingerprint input, only if a fingerprint is positioned in a sensing area.

Although the fingerprint sensor 110 obtains the fingerprint input, the processor 120 may not identify a fingerprint if the fingerprint input is weak or indistinct. As a distance increases between the fingerprint 10 and the sensing area 20, as illustrated in FIG. 2D, it may be more difficult for the fingerprint sensor 110 to obtain the fingerprint input that is identifiable.

The processor 120 may obtain a position where a fingerprint is not recognized in the sensing area 20 (hereinafter referred to as a 'fingerprint-unrecognizable position'). According to an embodiment, the processor 120 may obtain a point of the sensing area 20, at which a signal value detected from a receiver of the fingerprint sensor 110 becomes lower than a predetermined value, as a fingerprint-unrecognizable position for the fingerprint.

According to an embodiment of the present disclosure, based on a touch input by a fingerprint, the processor 120 may obtain a fingerprint-unrecognizable position from the sensing area 20. For example, the fingerprint sensor 110 may be built into the touch screen 130. The touch screen 130 may be a flexible touch screen. The processor 120 may detect a touch input on the sensing area 20 through the touch screen 130. The processor 120 may obtain the fingerprint-unrecognizable position based on such a touch input.

According to an embodiment of the present disclosure, the processor 120 may obtain a fingerprint image from the fingerprint 10 through fingerprint detection and then obtain a fingerprint-unrecognizable position based on the fingerprint image. For example, the processor 120 may obtain such a fingerprint-unrecognizable position based on resolution, contrast, image quality, and the like.

A manner of obtaining a fingerprint-unrecognizable position by the processor 120 may not be restrictive to the aforementioned ways. It can be seen by those ordinarily skilled in the art that the processor 120 may obtain a fingerprint-unrecognizable position through various ways.

The processor 120 may obtain a distance from a fingerprint-unrecognizable position of the sensing area 20 to the fingerprint 10, and then, based on the distance, control the fingerprint sensor 110 to adjust a sensing operation.

According to an embodiment of the present disclosure, the processor 120 may obtain a horizontal distance from a reference line, which is vertical to the sensing area 20, to the fingerprint-unrecognizable position and then, based on the horizontal distance, and curvature angle and radius of a curve, obtain a distance between the sensing area and a fingerprint. This will be described in more detail in conjunction with FIGS. 7, 8A and 8B.

The processor 120 may control the fingerprint sensor 110 to adjust at least one of a signal value, which is detected from a receiver of the fingerprint sensor 110, and power of a transmitter of the fingerprint sensor 110. The fingerprint sensor 110 may resume fingerprint detection after adjusting a sensing operation. This will be described in more detail in conjunction with FIGS. 9A and 9B.

Additionally, the processor 120 may obtain a fingerprint image which is obtained by detecting the fingerprint 10 through the fingerprint sensor 110. The processor 120 may perform image processing to the fingerprint image.

The processor 120 may perform fingerprint authentication to determine whether the fingerprint 10 obtained by a sensing operation is a registered fingerprint. According to an embodiment, the processor 120 may compare a detected fingerprint image with a registered fingerprint image, and then determine a coincidence between an obtained fingerprint image (i.e., the detected fingerprint image) and the registered fingerprint image. Otherwise, the processor 120 may use a feature, which is extracted from a fingerprint image, to determine a coincidence with the registered fingerprint. Additionally, the processor 120 may use a variety of fingerprint authentication techniques.

The processor 120 according to an embodiment of the present disclosure may be formed of at least one or more processors.

The touch screen 130 may display a screen in response to a control signal of the processor 120 and detect a touch input on the screen. The touch screen 130 may transfer a detected touch input to the processor 120. The processor 120 may thereby control to perform a specific function corresponding to a user's touch input.

The touch screen 130 may include a flexible touch screen. The fingerprint sensor 110 according to an embodiment may be built in a flexible touch screen.

According to an embodiment of the present disclosure, the touch screen 130 may detect a touch input by the fingerprint 10 from the sensing area 20. Then, the processor 120 may obtain a fingerprint-unrecognizable position based on a touch input on the touch screen 130.

According to an embodiment of the present disclosure, the touch screen 130 may find a fingerprint position on a sensing area of the fingerprint sensor 110. Additionally, the touch screen 130 may display a feedback to a fingerprint position, based on the found fingerprint position. This will be described in more detail in conjunction with FIGS. 11A and 11B.

According to an embodiment of the present disclosure, the touch screen 130 may display an icon of at least one application which is executed by fingerprint authentication at a position of a sensing area of the fingerprint sensor 110. Accordingly, the processor 120 may execute at least one application by fingerprint authentication of the fingerprint sensor 110.

The touch screen 130 according to an embodiment may use sensors, which are provided on the surface of the touch screen 130, to convert state changes of the sensors, such as pressure, electrostatic capacitance, optical intensity, and the like, into electric signals for touch input detection. The touch screen 130 according to an embodiment may be implemented in various ways such as resistance, electrostatic capacitance, ultrasonic wave, infrared ray, etc.

The storage part 140 may be, for example, a general storage medium, and may store data or programs necessary for recognizing and authenticating the fingerprint 10 by the fingerprint sensor 110. The storage part 140 may store a fingerprint which is registered through the fingerprint sensor 110 and the processor 120. Additionally, the storage part 140 may store data or programs necessary for displaying a screen and detecting a touch input in the touch screen 130. Additionally, the storage part 140 may store program routines or instruction sets necessary for enabling the processor 120 to control the fingerprint sensor 110 or the touch screen 130.

Additionally, the storage part 140 may store data or programs necessary for operations of the electronic device 100. The storage part 140 according to an embodiment of the present disclosure may be implemented in a hard disk drive (HDD), a read-only memory (ROM), a random access memory (RAM), a flash memory, a memory card, a Negative-AND (NAND) memory, and/or a solid state drive (SSD).

Figure 4:
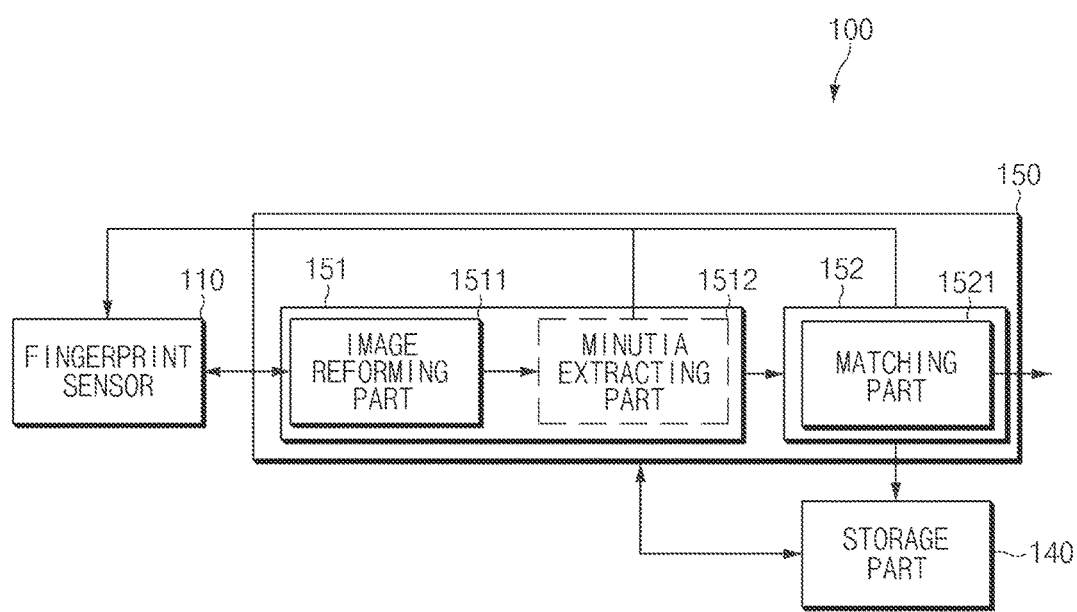
FIG. 4 is a block diagram illustrating an electronic device according to an embodiment of the present disclosure.

FIG. 4 is a block diagram illustrating an electronic device according to an embodiment of the present disclosure.

Referring to FIG. 4, an electronic device 100 is illustrated, where the electronic device 100 may be formed of a storage part 140 and a fingerprint processing module 150. The fingerprint processing module 150 may be formed of an image processing part 151 and a fingerprint authenticating part 152.

For the purpose of preventing a feature of the present disclosure from being vague, elements relevant only to an embodiment of the present disclosure will be described hereinafter. Thus, it can be rightly understood by those ordinarily skilled in the art that other general elements in addition to those shown in FIG. 4 may be further included therein.

Referring to FIG. 4, a fingerprint sensor 110 may detect an object with a predetermined permittivity. Further, the fingerprint sensor 110 may transfer sensor data, which is obtained through a sensing operation, to the fingerprint processing module 150.

The storage part 140, which may be a general storage medium, may store a fingerprint which is registered through the fingerprint sensor 110 and the fingerprint processing module 150. Additionally, the storage part 140 may store data or programs necessary for performing image processing of sensor data and determining whether a recognized fingerprint is a registered fingerprint.

The fingerprint processing module 150 may receive the sensor data, which is obtained from the fingerprint sensor 110, perform image processing of the received sensor data, and perform fingerprint authentication. The fingerprint processing module 110 may correspond to at least one or more processors, or may be driven in a condition of belonging to an application processor (AP) or another processor (not shown).

The image processing part 151 may receive the sensor data, which is obtained from the fingerprint sensor 110, and reform the received sensor data into an image. The image processing part 151 may transfer the reformed image to the fingerprint authenticating part 152.

According to an embodiment of the present disclosure, the image processing part 151 may be formed of an image reforming part 1511 and a minutia extracting part 1512. The image reforming part 1511 may combine sensor data to reform a fingerprint image. The minutia extracting part 1512 may extract minutia information, which is used for finding inherent characteristics of a fingerprint, from a reformed fingerprint image. The minutia extracting part 1512 may generate a template based on the extracted minutia information.

According to an embodiment of the present disclosure, the image processing part 151 may display minutia information in a reformed fingerprint image through an image processing operation, and use the fingerprint image, in which the minutia information is displayed, as a template.

The fingerprint authenticating part 152 may perform a fingerprint authentication processing to a recognized fingerprint. The fingerprint authentication processing may be a series of operations for performing fingerprint authentication. The fingerprint authenticating part 152 may perform the fingerprint authentication processing to determine whether there is a registered fingerprint identical to a recognized fingerprint.

According to an embodiment of the present disclosure, the fingerprint authenticating part 152 may include a matching part 1521. The fingerprint authenticating part 152 may receive the minutia information, a fingerprint image, and/or a template. Based on at least one of the received minutia information, the fingerprint image, and/or the template, the matching part 1521 may determine whether a recognized fingerprint is identical to a registered fingerprint. For example, the matching part 1521 may calculate a similarity between a template of a registered fingerprint and a template which is received from the image processing part 151, and thereby determine whether the recognized fingerprint is identical to the registered fingerprint. Otherwise, the matching part 1521 may calculate similarity between an image of the registered fingerprint and an image which is received from the image processing part 151, and thereby determine whether the recognized fingerprint is identical to the registered fingerprint.

FIGS. 5A, 5B, 5C and 5D are diagrams illustrating an operation of performing fingerprint authentication in an electronic device according to various embodiments of the present disclosure.

An operation of extracting minutia from an obtained fingerprint image by the minutia extracting part 1512, as illustrated in FIG. 4, is discussed below.

Referring to FIG. 5A, a fingerprint image is illustrated, where the fingerprint image is reformed by the image reforming part 1511, as illustrated in FIG. 4.

Furthermore, referring to FIG. 5A, a fingerprint is generally shaped in ridges and valleys between the ridges.

Referring to FIG. 5B, minutia are illustrated, where the minutia are extracted by the minutia extracting part 1521. For example, the minutia extracting part 1521 may extract branches of ridges, endpoints of ridges, and the like as minutia thereof.

Referring to FIG. 5C, a process of generating a template is illustrated, where the template is generated based on minutia information which are extracted by the minutia extracting part 1512. The minutia extracting part 1512 may form the extracted minutia into a template.

Referring to FIG. 5D, the fingerprint processing module 150, as illustrated in FIG. 4, may store data, which is generated for the template, into a database (DB). Fingerprint data obtained from the fingerprint sensor may be stored in a form of an image, extracted minutia, or a combination of thereof, as well as in a form of the template.

FIGS. 6A, 6B, 6C and 6D are diagrams illustrating an operation of performing fingerprint authentication in an electronic device according to various embodiments of the present disclosure.

Figures 6A, 6B:
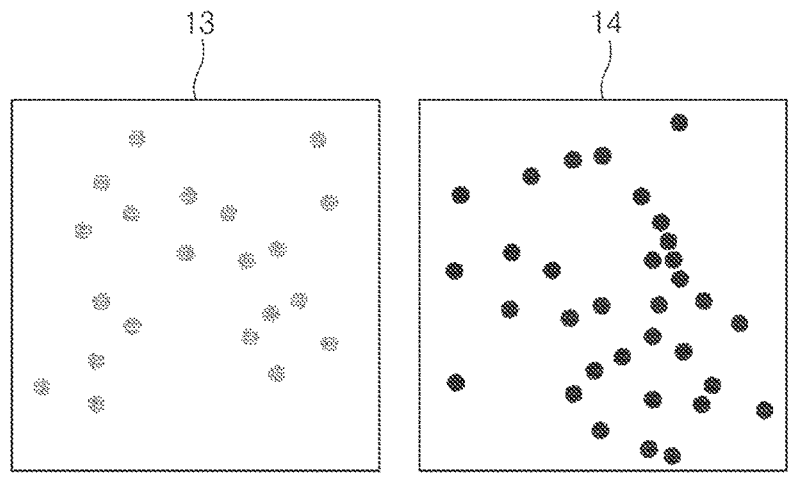
FIGS. 6A, 6B, 6C and 6D are diagrams illustrating an operation of performing fingerprint authentication in an electronic device according to various embodiments of the present disclosure.

Referring to FIG. 6A, the matching part 1521, as illustrated in FIG. 4, may perform a fingerprint authentication processing to an input fingerprint. The matching part 1521 may calculate a score about relativity between an input fingerprint and a registered fingerprint, and determine that the input fingerprint matches with a registered fingerprint if the score is higher than a threshold level.

Further, referring to FIG. 6A a first template 13 is illustrated, where the first template 13 includes minutia information of a registered fingerprint.

Referring to FIG. 6B a second template 14 is illustrated, where the second template 14 includes minutia information of an input fingerprint.

Figure 6C:
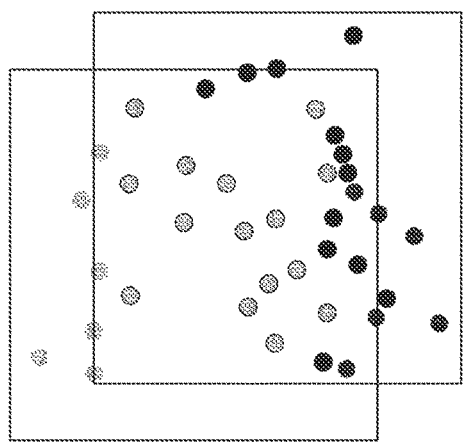

Referring to FIG. 6C, the matching part 1521 may match the first template 13 with the second template 14, and calculate a score about similarity between an input fingerprint and a registered fingerprint.

The matching part 1521 may use a function of an overlap area OA between the first template 13 and the second template 14, a minutia number N common to the first template 13 and the second template 14, registered minutia information E, and authenticated minutia information V to calculate a score therefrom, and then, based on the calculated score, may determine similarity between an input fingerprint and a registered fingerprint. The matching part 1521 may determine that an input fingerprint matches with a registered fingerprint if the calculated score is higher than a threshold level, and then authenticate the input fingerprint.

Figure 6D:
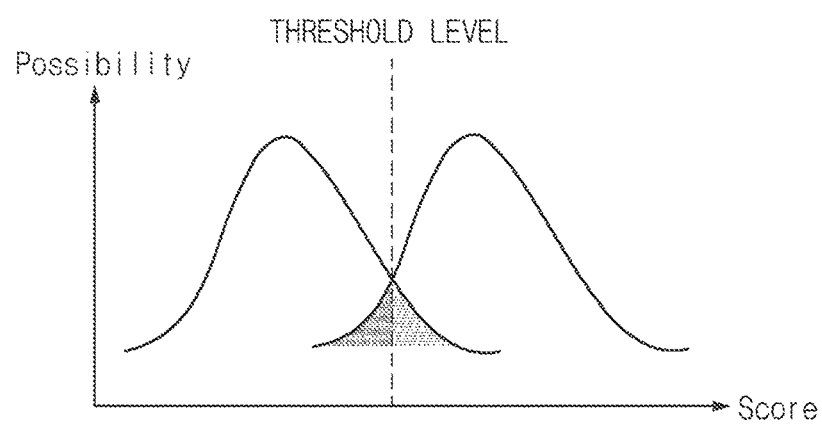

Referring to FIG. 6D, a threshold level is illustrated, where the threshold level acts as a reference for determining similarity, may be a value set dependent on a fingerprint misrecognition rate.

Specifically, FIG. 6D is a graphic diagram illustrating a relativity between a fingerprint misrecognition rate and a threshold level. To the left of the threshold level, the graph shows possibilities of determining fingerprint mismatch along scores. Further, to the right of the threshold level the graph shows possibilities of determining fingerprint matches along scores. For example, as shown in FIG. 6D, the threshold level may be determined on a point where the two graphs meets each other. Based on the threshold level, the left field indicates a false reject rate (FRR) that determines a fingerprint mismatch even though an input fingerprint is identical to a registered fingerprint.

Based on the threshold level, the right field indicates a false accept rate (FAR) that determines a fingerprint match even though an input fingerprint is different from a registered fingerprint. With this condition, there may be caused a problem that: if a threshold level decreases, the FAR becomes higher to raise a possibility of determining even different persons as the same person; and contrarily, if a threshold level increases, the FRR becomes higher to raise a possibility of determining even the same person match as different persons. These results may increase inconvenience for a user. Therefore, a threshold level may be set in consideration with both FAR and FRR.

Figure 7:
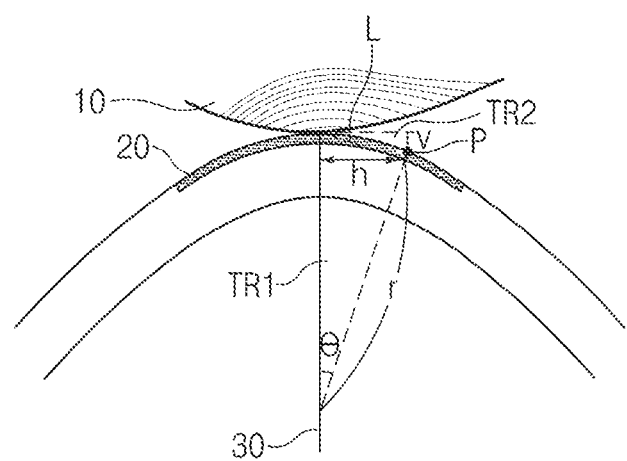
FIG. 7 is a diagram illustrating an operation of recognizing a fingerprint in an electronic device according to an embodiment of the present disclosure.

FIG. 7 is a diagram illustrating an operation of recognizing a fingerprint in an electronic device according to an embodiment of the present disclosure.

Referring to FIG. 7, and as aforementioned in conjunction with FIGS. 3 and 4, the processor 120 may obtain a position P at which a fingerprint is not recognized due to a curve of a sensing area 20 of the fingerprint sensor 120.

The processor 120 may obtain a distance v that ranges to a fingerprint 10 from the position P on the sensing area 20, and then, based on the distance v, control the fingerprint sensor 110 to adjust a sensing operation of the fingerprint sensor 110.

According to an embodiment, the processor 120 may obtain the distance v by way of the following process.

First, the processor 120 may obtain a horizontal distance h that ranges to the position P from a reference line 30 which is vertical to the sensing area 20. While an embodiment of the present disclosure is illustrated as the reference line 30 is set on the center of curve of the sensing area 20, the present disclosure may not be restrictive hereto in various embodiments thereof. The reference line 30 may be set, not on the center of curve of the sensing area 20, even on another position that is vertical to the sensing area 20. The reference line 30 may be set on an appropriate location, which is vertical to the sensing area 20, depending on a shape of curve of the sensing area 20.

A location of the reference line 30 may be set in advance. Otherwise, a location of the reference line 30 may be set by the processor 120 during fingerprint recognition. According to this, the processor 120 may set a location of the reference line 30 based on at least one of a touch input, which is received through the fingerprint sensor 110, and a fingerprint image which is obtain from the fingerprint sensor 110.

If the reference line 30 is set in advance or set by the processor 120, the processor 120 may obtain a horizontal distance h from the reference line 30 to the position P.

The processor 120 may obtain the distance v from the horizontal distance h, and a curvature angle θ and a curvature radius r of a curve to the position P from the reference line 30 of the sensing area 20.

Referring to FIG. 7, by using the characteristics that two triangles TR1 and TR2 share an oblique side L, the distance v may be obtained.

$$\sqrt{r^2+r^2-2r^2\cos(\theta)}=\sqrt{h^2+v^2} \qquad \text{Equation 1}$$

In Equation 1, the left term denotes a length of the oblique side L of the triangle TR1 and the right term denotes a length of the oblique side L of the triangle TR2. Equation 1 may be summarized to result in Equation 2 for calculating the distance v, as follows.

$$v=\sqrt{2r^2-2r^2\cos(\theta)-h^2} \qquad \text{Equation 2}$$

As shown in Equation 2, the distance v may be given by an equation involved in the horizontal distance h, the curvature radius r, and the curvature angle θ.

In the meantime, the curvature angle θ and the curvature radius r may be preliminarily valued in accordance with a shape of curve of the sensing area 20. For example, the storage part 140 may preliminarily store values of the curvature radius r and the curvature angle θ that correspond to respective positions of the sensing area.

Otherwise, the curvature angle θ and the curvature radius r, which correspond to the position P, may be determined by the processor 120 in accordance with a shape and curvature of curve of the sensing area during execution of fingerprint recognition.

The processor 120, based on the distance v obtained as such, may act to control a sensing operation of the fingerprint sensor 110. For example, the processor 120 may control the fingerprint sensor 110, based on the distance v, to adjust at least one of detected signal value and amplification gain.

On the other hand, based on an obtained value of the distance v, the processor 120 may control the fingerprint sensor 110 to adjust transmission power of a transmitter in correspondence with the position P.

Figure 8A:
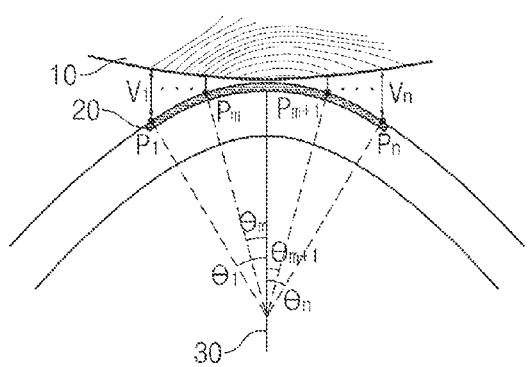
FIGS. 8A and 8B are diagrams illustrating a recognizing of a fingerprint in an electronic device according to various embodiments of the present disclosure.
Figure 8B:
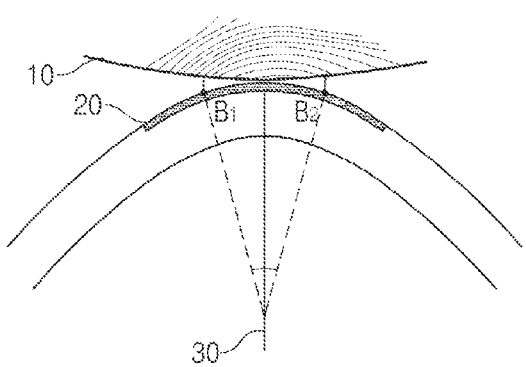

FIGS. 8A and 8B are diagrams illustrating a recognizing of a fingerprint in an electronic device according to an embodiment of the present disclosure.

Referring to FIG. 8A, an operation is illustrated, where the operation calculates a distance to an area that is out of a fingerprint recognition range in the electronic device 100, as illustrated in FIG. 4.

In an embodiment of the present disclosure, the processor 120, as illustrated in FIG. 3, may obtain a plurality of positions P1, . . . , Pm, Pm+1, . . . , and Pn (hereinafter abbreviated to P1~Pn) which are located within an area where any fingerprint cannot be recognized.

Referring to FIG. 8A, the electronic device 100, as described in conjunction with FIGS. 3 and 7, may obtain curvature angles θ1, . . . , θm, θm+1, . . . , and θn, with reference to a reference line 30, and distances V1, . . . , Vm, Vm+1, . . . , and Vn (hereinafter abbreviated to as V1~Vn) respective to the plural positions P1~Pn by obtaining the fingerprint-unrecognizable position P and repeating a process of obtaining the distance to a fingerprint 10 from the position P of a sensing area 20.

The processor 120, based on the distances V1~Vn respective to the plural positions P1~Pn, may control the fingerprint sensor 110 to adjust at least one of a signal value, which is detected from a receiver of the fingerprint sensor 110 in correspondence with each of the plural positions P1~Pn, transmission power of a transmitter of the fingerprint sensor 110, and an amplification gain of the transmitter.

For example, as the distance becomes larger, the processor 120 may control the fingerprint sensor 110 to increase at least one of a signal value, which is detected from a receiver of the fingerprint sensor 110, an amplification gain of the receiver, and transmission power of a transmitter of the fingerprint sensor 110. Accordingly, it may be allowable to vary a signal value, which is detected from a receiver of the fingerprint sensor 110, an amplification gain of the receiver, and transmission power of a transmitter of the fingerprint sensor 110.

Referring to FIG. 8B, an operation of detecting a fingerprint 10 is illustrated, where the operation uses a sensing area 20 to calculate a distance to a fingerprint-unrecognizable area in the electronic device 100, as illustrated in FIG. 4, based on a reference line 30.

In an embodiment of the present disclosure, different from FIG. 8A, the processor 120, as illustrated in FIG. 3, may obtain boundary positions B1 and B2 on an area corresponding to the fingerprint-unrecognizable area.

The electronic device 100 may obtain the distances V1 and V2 respective to the boundary positions B1 and B2. Accordingly, the processor 120, based on the distances V1 and V2 of the boundary positions B1 and B2, may estimate the plural distances V1~Vn respective to the plural positions P1~Pn in accordance with the plural positions P1~Pn on the fingerprint-unrecognizable area.

Otherwise, the processor 120, based on the distances V1 and V2 of the boundary positions B1 and B2, may determine at least one of a signal value, which is detected from a receiver of the fingerprint sensor 110, as illustrated in FIG. 3, an amplification gain of the receiver, and transmission power of a transmitter of the fingerprint sensor 110, respective to the plural positions P1~Pn on a fingerprint-unrecognizable area in accordance with the plural positions P1~Pn of the fingerprint-unrecognizable area. Accordingly, it may be allowable to vary a signal value, which is detected from a receiver of the fingerprint sensor 110, an amplification gain of the receiver, and transmission power of a transmitter of the fingerprint sensor 110.

Figure 9A:
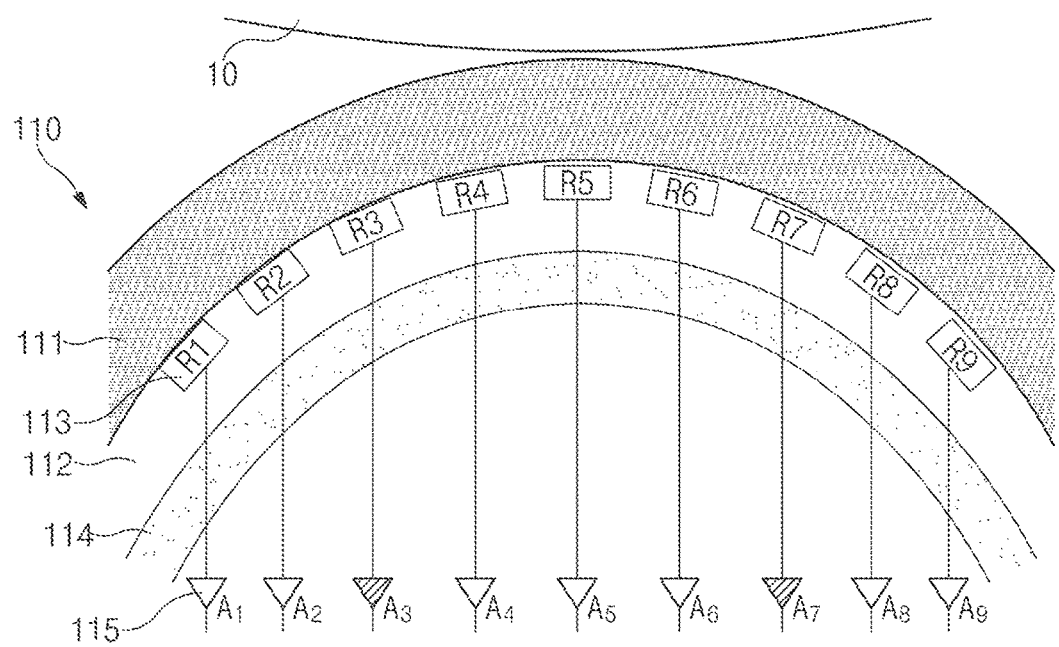
FIGS. 9A and 9B are diagrams illustrating a feature of adjusting a sensing operation of a fingerprint sensor in an electronic device according to various embodiments of the present disclosure.
Figure 9B:
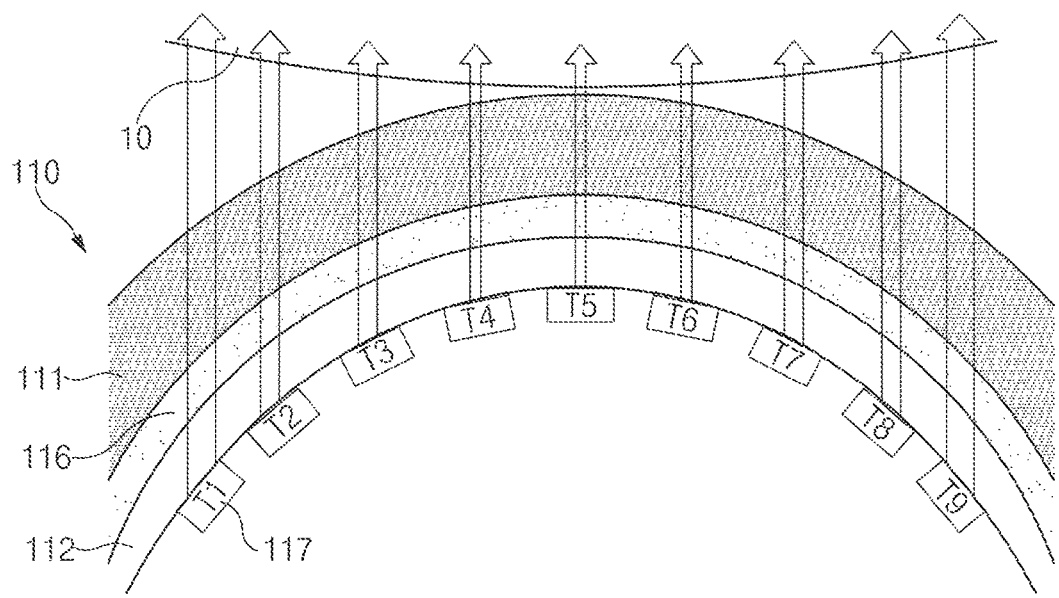

FIGS. 9A and 9B are diagrams illustrating a feature of adjusting a sensing operation of a fingerprint sensor in an electronic device according to various embodiments of the present disclosure.

Referring to FIG. 9A, an operation is illustrated, where the operation includes adjusting a signal value which is detected from a receiver of a fingerprint sensor 110 in the electronic device 100, as illustrated in FIG. 4.

The fingerprint sensor 110 according to an embodiment of the present disclosure may be formed of a cover 111, an insulation layer 112, a reception part 113, a transmission part 114, and an amplification part 115. The fingerprint sensor 110 may further include other general elements in addition to these elements shown in FIG. 9A.

The reception part 113 according to an embodiment of the present disclosure may include a plurality of receivers R1, R2, . . . , and R9 (R1~R9) which are arranged along the sensing area 20, as illustrated in FIG. 2. In this configuration, the receivers R1~R9 may respectively act as sensing electrodes.

The processor 120, as illustrated in FIG. 3, based on a distance of a fingerprint-unrecognizable position on the sensing area 20, may adjust a signal value which is detected from the receiver corresponding to the position.

Otherwise, the processor 120, based on distances of fingerprint-unrecognizable positions on the sensing area 20, may adjust amplification gains of amplifiers A1, A2, . . . , and A9 (A1~A9) coupled with the receivers corresponding to the positions. FIG. 9A illustrates that the plural amplifiers A1~A9 are coupled one by one with the receivers, whereas the present disclosure may not be restrictive hereto in embodiments. The plural receivers may be coupled with a single amplifier which is capable of adjusting amplification gains of the receivers.

If a plurality of positions of a fingerprint-unrecognizable area in the sensing area is obtained, the processor 120 may adjust signal values, which are detected from the receivers corresponding respectively to the plural positions, or amplification gains of the receivers based on distances of the plural positions.

Signal values detected from the receivers corresponding each to a plurality of the positions of the fingerprint-unrecognizable area, or amplification gains of the receivers, may be determined in proportion respectively to the plural positions. For example, the processor 120 may control the fingerprint sensor 110 to increase signal values detected from the receivers of the fingerprint sensor 110, and amplification gains of the receivers 110 as large as the distances.

Otherwise, the processor 120, by adding weights that respectively accord to distances respective to a plurality of positions of a fingerprint-unrecognizable area, may determine signal values, which are detected from the receivers corresponding respectively to the plural positions, and amplification gains of the receivers. For example, as a fingerprint surface 10 of a finger is uneven, the processor 120 may add a weight to each distance of each fingerprint-unrecognizable position, and thereby control the fingerprint sensor 110 to increase a signal value or amplification gain that is detected from the receiver of the fingerprint sensor 110.

Accordingly, it may be allowable to vary signal values, which are detected from the receivers of the fingerprint sensor 110, depending on positions of the sensing area.

Referring to FIG. 9B, an operation is illustrated, where the operation includes adjusting transmission power of a transmitter of a fingerprint sensor 110 in the electronic device 100, as illustrated in FIG. 4.

The fingerprint sensor 110 according to an embodiment of the present disclosure may be formed of a cover 111, an insulation layer 112, a reception part 116, and a transmission part 117. For the sake of preventing a features of the present disclosure from being vague, elements involved only in an embodiment of the present disclosure will be described hereinafter. Therefore, the fingerprint sensor 110 may further include other general elements in addition to these elements shown in FIG. 9B.

The fingerprint sensor 110 according to an embodiment of the present disclosure may include a plurality of transmitters T1, T2, . . . , and T9 (T1~T9) which are arranged along the sensing area 20, as illustrated in FIG. 2. In this configuration, the plural transmitters T1~T9 may act respectively as sensing electrodes.

The processor 120, as illustrated in FIG. 3, based on a distance of a fingerprint-unrecognizable position on the sensing area 20, may adjust transmission power of the transmitter corresponding to the position.

If the processor 120 obtains a plurality of positions of a fingerprint-unrecognizable area in the sensing area, the processor 120 may adjust transmission power of the transmitters, which correspond respectively to the plural positions, based on distances respective to the plural positions.

Transmission power of the transmitters corresponding respectively to the plural positions of the fingerprint-unrecognizable area may be determined in proportion each to the distances respective to the plural positions. For example, the processor 120 may control the fingerprint sensor 110 to increase transmission power of the transmitters as large as the distances.

Otherwise, the processor 120, by adding weights that respectively accord to distances respective to a plurality of positions of a fingerprint-unrecognizable area, may determine transmission power of the transmitters corresponding respectively to the plural positions. For example, as a fingerprint surface 10 of a finger is uneven, the processor 120 may add a weight to each distance of each fingerprint-unrecognizable position, and thereby control the fingerprint sensor 110 to increase transmission power of the transmitter.

Accordingly, it may be allowable to vary transmission power of the transmitters of the fingerprint sensor 110 in correspondence with positions of the sensing area.

Figure 10A:
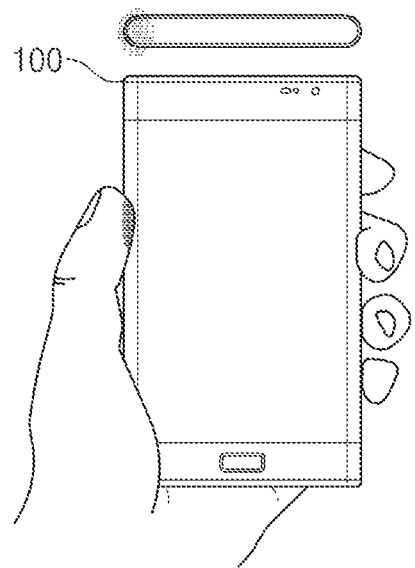
FIGS. 10A, 10B and 10C are diagrams illustrating an operation of performing fingerprint recognition in an electronic device, which is equipped with a fingerprint sensor at a side thereof, according to various embodiments of the present disclosure.
Figure 10B:
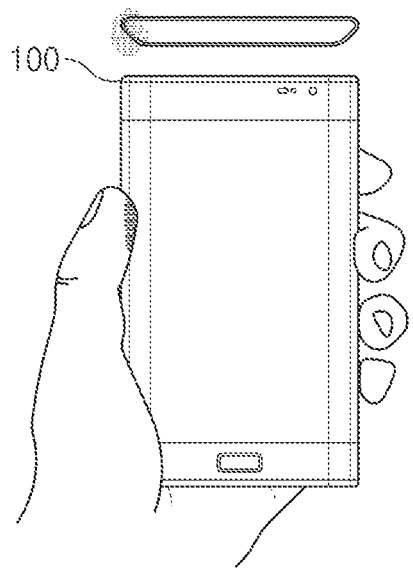
Figure 10C:
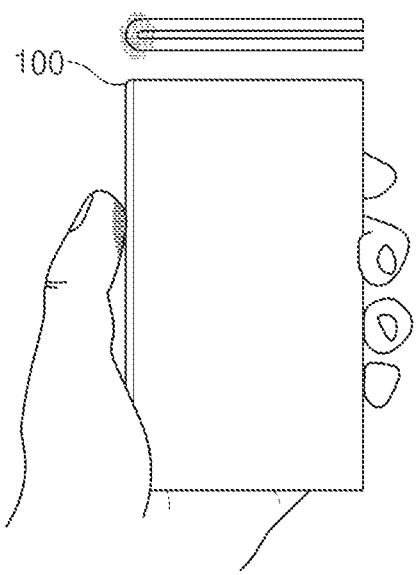

FIGS. 10A, 10B and 10C are diagrams illustrating an operation of performing fingerprint recognition in an electronic device, which is equipped with a fingerprint sensor at a side thereof, according to various embodiments of the present disclosure.

While FIGS. 10A to 10C illustrate a mobile terminal having the fingerprint sensor 110, as illustrated in FIG. 3, an embodiment of the present disclosure may not be restrictive to such a mobile terminal and may also include any kind of electronic device 100 which is equipped with a fingerprint sensor.

The electronic device 100 according to an embodiment of the present disclosure may include a curve at a side part thereof. The fingerprint sensor 110 may be placed at a side of the electronic device 100.

After a user places their finger on a side of the electronic device 100, as aforementioned, the electronic device 100 may adjust a sensing operation of the fingerprint sensor 110 corresponding to fingerprint-unrecognizable positions that are caused from the curve and thereby may accomplish to distinctly recognize the fingerprint.

Referring to FIGS. 10A to 10C, the electronic device 100 may distinctly recognize a fingerprint even though various shapes of curves are present in a sensing area of the fingerprint sensor.

According to an embodiment, a side part of the electronic device 100 may be formed of a touch screen 130. The touch screen 130 may be a kind of flexible touch screen. Accordingly, the fingerprint sensor 110 may be equipped in such a flexible touch screen.

The fingerprint sensor 110 shown in FIGS. 10A to 10C is illustrated as being located on a side of a mobile terminal or the electronic device 100, whereas various embodiments of the present disclosure may not be restrictive hereto. Additionally, the fingerprint sensor 110 may be placed at a location, which includes a curve, for example, a rear, front, upper, or lower side of a mobile terminal or the electronic device 100.

Figure 11A:
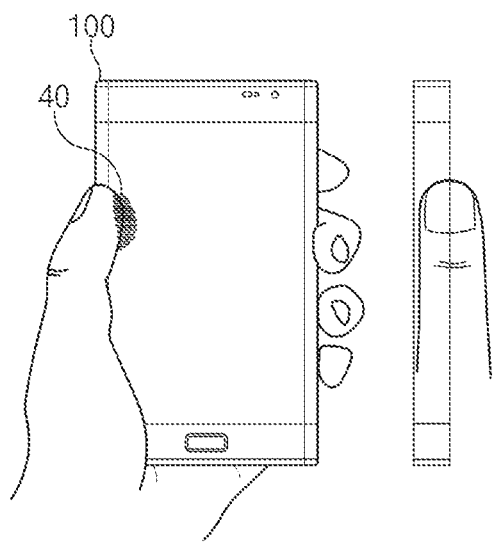
FIGS. 11A and 11B are diagrams illustrating a feature of providing a feedback to a fingerprint position on a sensing area in an electronic device according to various embodiments of the present disclosure.
Figure 11B:
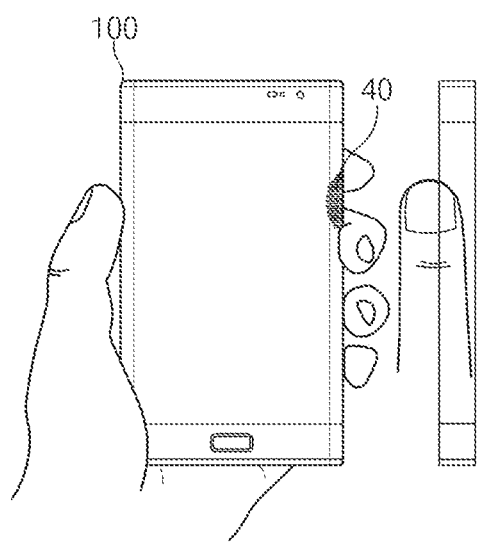

FIGS. 11A and 11B are diagrams illustrating a feature of providing a feedback to a fingerprint position on a sensing area in an electronic device according to various embodiments of the present disclosure.

Referring to FIGS. 11A and 11B, the fingerprint sensor 110, as illustrated in FIG. 3, may be placed at a side of the electronic device 100. A side part of the electronic device 100 may include a curve. After a user places their finger on a sensing area, the processor 120, as illustrated in FIG. 3, may identify a fingerprint area, on the sensing area, into which a fingerprint input of a finger is received. The processor 120 may compare the centers of curves to one another between the fingerprint area and the sensing area, and then, based on a result of the comparison, provide the user with a feedback that relates to a position of the fingerprint.

If the fingerprint area is out of a range from the center of curve of the sensing area, the touch screen 130, as illustrated in FIG. 3, may display a direction and degree of the fingerprint area, which is out of a range from the sensing area, in a predetermined form. For example, the predetermined form may be made of a shadow 40 which has a pattern of fingerprint. However, various embodiments of the present disclosure may not be restrictive hereto and the predetermined form may be available in all visible kinds such as lighting, static image, dynamic image, and the like. Additionally, the processor 120 may provide sound or haptic data together with a predetermined form. The touch screen 130 according to an embodiment of the present disclosure may include a flexible touch screen.

If a fingerprint area identified by the processor 120 is out of a range from the center of curve of a sensing area as shown in FIGS. 11A and 11B, the processor 120, based on a result of the comparison, may control a feedback, which relates to a fingerprint position, to be displayed on a screen in a predetermined form. If a fingerprint position is inclined frontward from the center of curve of a sensing area as shown in the right of FIG. 11A, the touch screen 130 may display a shadow 40, which shows that the position of the fingerprint is inclined frontward, at a side where a hand is located as shown in FIG. 11A.

On the other hand, if a fingerprint position is shifted backward from the center of curve of a sensing area as shown in the left of FIG. 11B, the touch screen may display a shadow 40, which is patterned in a shape of fingerprint to show that the position of the fingerprint is shifted backward, at the counter side of a location of a hand as shown in FIG. 11B.

In this manner, the electronic device 100 may provide a feedback in accordance with a fingerprint position on a sensing area and thereby complete fingerprint recognition of the fingerprint sensor 110.

Additionally, if the fingerprint sensor 110 is placed at a side of the electronic device 100 as like an embodiment of the present disclosure, a user may be able to refer to a feedback, which relates to a fingerprint position displayed at the front of the electronic device 100, and identify the position of the fingerprint even without turning a direction of the electronic device 100 toward its side. Accordingly, it may improve the facility for a user.

An embodiment of the present disclosure is described as the electronic device 100 determines whether a fingerprint position is out of a range from a sensing area on the center of curve. However, various embodiments of the present disclosure may not be restrictive hereto. The electronic device 100 may also determine whether a fingerprint position is out of a range from a sensing area on a predetermined position in accordance with a pattern of curve of the sensing area.

Additionally, the fingerprint sensor 110 discussed in relation to FIGS. 11A and 11B is illustrated as being located at a side of a mobile terminal or the electronic device 100, whereas the various embodiments of the present disclosure may not be restrictive hereto. The fingerprint sensor 110 may be placed at a location, which includes a curve, such as a rear, front, upper, or lower side of a mobile terminal or the electronic device 100.

Figure 12:
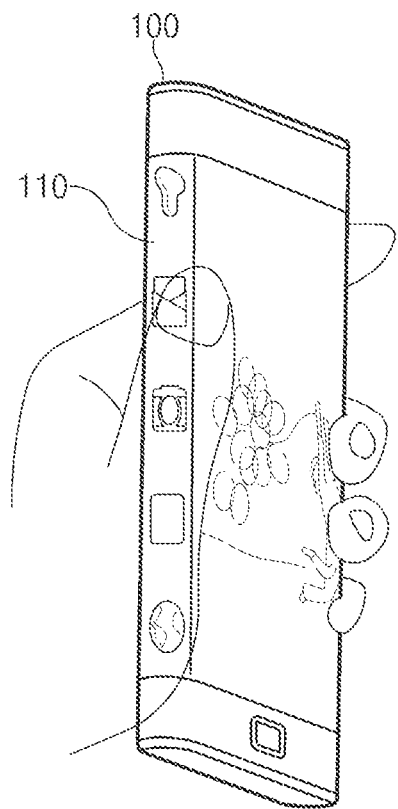
FIG. 12 is a diagram illustrating a feature of performing fingerprint authentication in a flexible touch screen including a fingerprint sensor according to an embodiment of the present disclosure.

FIG. 12 is a diagram illustrating a feature of performing fingerprint authentication in a flexible touch screen including a fingerprint sensor according to an embodiment of the present disclosure.

Referring to FIGS. 3 and 12, in an embodiment of the present disclosure, a fingerprint sensor 110 may be built in a touch screen 130. The fingerprint sensor 110 according to an embodiment of the present disclosure may be placed at a side part of the electronic device 100. The side part of the electronic device 100 may include a curve.

Referring to FIG. 12, the touch screen 130 may display an icon of at least one application which is executed by fingerprint authentication at a position of a sensing area of the fingerprint sensor 110. The touch screen 130 according to an embodiment of the present disclosure may be a flexible touch screen. Accordingly, the fingerprint sensor 110 may be built in a flexible touch screen.

If a user places their fingerprint on an icon which is indicated at a position of a sensing area, the electronic device 100 may perform an operation to recognize the user's fingerprint. If fingerprint authentication is accomplished, the electronic device 100 executes the icon corresponding thereto.

In this manner, the electronic device 100 may display an icon of an application, which uses fingerprint authentication, at a position of a sensing area, and control to execute the application by fingerprint authentication for a user.

Additionally, if the fingerprint sensor 110 is placed at a side of the electronic device 100, an icon of an application using fingerprint authentication is disposed at a side of the electronic device 100 to enable a user to perform a fingerprint sensing operation at the same time when the user is gripping the electronic device 100. Accordingly, the user may be able to immediately execute an application, which needs security authentication, without an additional handling for fingerprint recognition by making a fingerprint of a finger, which is gripping the electronic device 100, to be detected on a sensing area. Thus, it may improve user facility.

The fingerprint sensor 110 of FIG. 12 is illustrated as being located at a side of a mobile terminal or the electronic device 100, whereas various embodiments of the present disclosure may not be restrictive hereto. Additionally, the fingerprint sensor 110 may be placed at a location, which includes a curve, such as a rear, front, upper, or lower side of a mobile terminal or the electronic device 100.

Figure 13:
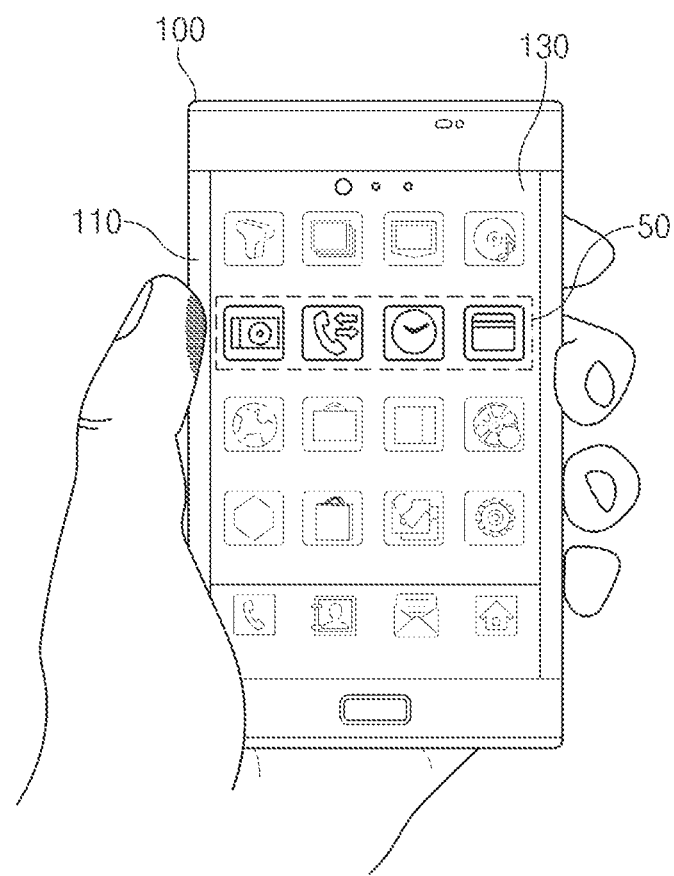
FIG. 13 is a diagram illustrating a feature of performing a plurality of icons, which are located in a same row with a fingerprint authentication position, by fingerprint authentication of a fingerprint sensor placed at a side of an electronic device according to an embodiment of the present disclosure.

FIG. 13 is a diagram illustrating a feature of performing a plurality of icons, which are located in a same row with a fingerprint authentication position, by fingerprint authentication of a fingerprint sensor placed at a side of an electronic device according to an embodiment of the present disclosure.

Referring to FIG. 13, a fingerprint sensor 110 may be placed at a side part of the electronic device 100. The side part of the electronic device 100 may include a curve.

Referring to FIG. 13, a touch screen 130 may be placed at a front part of the electronic device 100 and display an icon 50 of at least one application, which is executed with fingerprint authentication, in a single row.

After a user places a fingerprint on a sensing area of a side part which is located in the same row with a row in which icons are displayed at a front part, the electronic device 100 may perform recognition for the fingerprint of the user. If fingerprint authentication is accomplished, the electronic device 100 an application corresponding to the icon 50 located in the same row with the sensing area.

In this manner, the electronic device 100 may display the icons 50 of a plurality of applications in the same row and control the plural applications to be coincidentally executed by one-time fingerprint authentication of a user.

Additionally, if the fingerprint sensor 110 is placed at a side of the electronic device 100, the electronic device 100 may perform fingerprint authentication for a plurality of applications at a same time by disposing the icons of the plural applications, which use fingerprint authentication, in a line at a front part of the electronic device 100 and then operating the fingerprint sensor, which is placed at the side, while a user is gripping the electronic device 100.

Accordingly, a user may be able to perform an authentication for a plurality of applications, which need security authentication, at a time, without repetitive fingerprint recognition respective to the plural applications, by way of one-time fingerprint sensing operation with a finger which is gripping the electronic device 100. Therefore, it may improve user facility.

The fingerprint sensor 110 of FIG. 13 is illustrated as placing at a side of a mobile terminal or the electronic device 100, whereas various embodiments of the present disclosure may not be restrictive hereto. Additionally, the fingerprint sensor 110 may be placed at a location, which includes a curve, such as a rear, front, upper, or lower side of a mobile terminal or the electronic device 100.

Figure 14A:
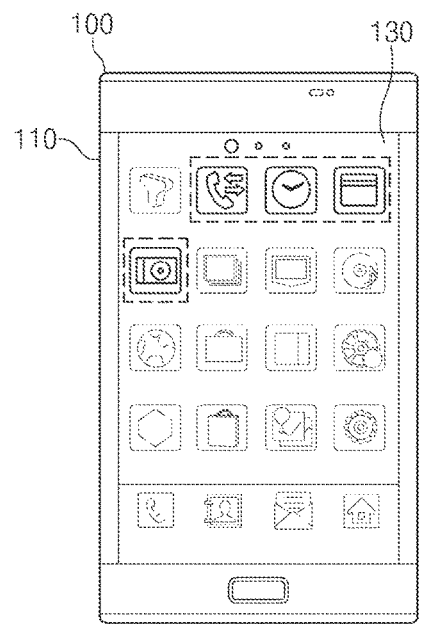
FIGS. 14A and 14B are diagrams illustrating a feature of arranging icons of applications, which use fingerprint authentication, in a same row with a fingerprint authentication position by fingerprint authentication of a fingerprint sensor placed at a side of an electronic device according to various embodiments of the present disclosure.
Figure 14B:
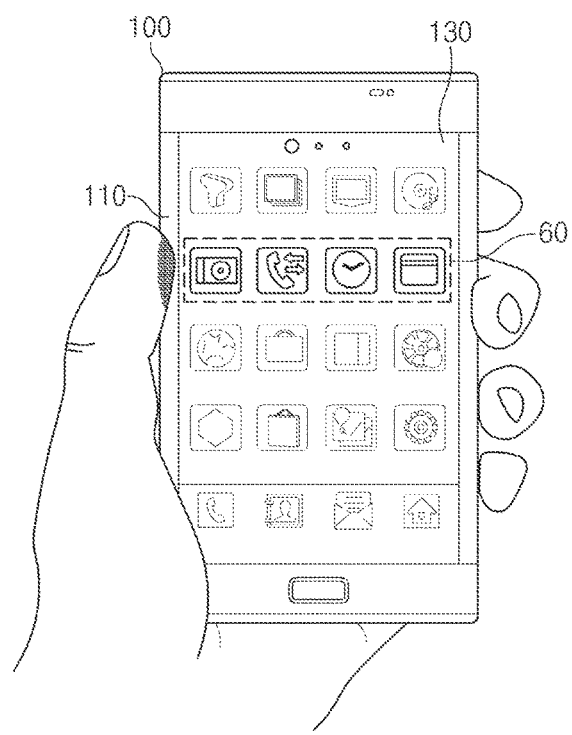

FIGS. 14A and 14B are diagrams illustrating a feature of arranging icons of applications, which use fingerprint authentication, in a same row with a fingerprint authentication position by fingerprint recognition of a fingerprint sensor placed at a side of an electronic device according to various embodiments of the present disclosure.

Referring to FIGS. 14A and 14B, a fingerprint sensor 110 according to an embodiment of the present disclosure may be placed at a side part of an electronic device 100. The side part of the electronic device 100 may include a curve. A touch screen 130 may be placed at a front part of the electronic device 100 and display an icon of at least one application which is executed by fingerprint authentication. During this, icons of at least one application executed by fingerprint authentication may be dispersed to locate over the touch screen 130 as shown in FIG. 14A.

If a user places a fingerprint on a sensing area, the fingerprint sensor 110 of the electronic device 100 may recognizes the fingerprint. If the fingerprint is recognized by the fingerprint sensor 110, the electronic device 100 may arrange icons of at least one application, which disperse over the touch screen 130 and use fingerprint authentication, in a row 60, as illustrated in FIG. 14B.

For example, if a fingerprint is recognized by the fingerprint sensor 110, as shown in FIG. 14B, the processor 120, as illustrated in FIG. 3, may control icons of applications, which use fingerprint authentication, in a same row with a position at which the fingerprint is recognized.

In this manner, the electronic device 100 may collect a plurality of icons of applications, which are dispersed and use fingerprint authentication, in the single row 60 by the fingerprint recognition. Accordingly, the electronic device 100 may provide information about an application, which uses fingerprint authentication, for a user. Additionally, if icons of a plurality of applications using fingerprint authentication are displayed in the same row 60, a user may be able to coincidentally execute the plural applications.

If the fingerprint sensor 110 is placed at a side of the electronic device 100, the fingerprint sensor 110 placed at the side may operate while a user is gripping the electronic device 100. If the fingerprint sensor 110 recognizes a fingerprint, icons of a plurality of applications using fingerprint authentication may be rearranged in a line at a front part of the electronic device 100.

A user, after finding icons of a plurality of applications using fingerprint authentication, may continue to operate the fingerprint sensor 110, while he is gripping the electronic device 100, and thereby coincidentally execute the fingerprint authentication for the rearranged applications.

Accordingly, although application icons using fingerprint authentication disperse over a front part of the electronic device 100, a user may be able to rearrange the application icons in a single row only by a simple handling of operating the fingerprint sensor 110. Therefore, it may improve user facility because a user may easily find application icons, which use fingerprint authentication, from a plurality of icons displayed in the screen by a simple operation.

The fingerprint sensor 110 of FIGS. 14A and 14B is illustrated as being located at a side of a mobile terminal or the electronic device 100, whereas various embodiments of the present disclosure may not be restrictive hereto. Additionally, the fingerprint sensor 110 may be placed at a location, which includes a curve, such as a rear, front, upper, or lower side of a mobile terminal or the electronic device 100.

Figure 15A:
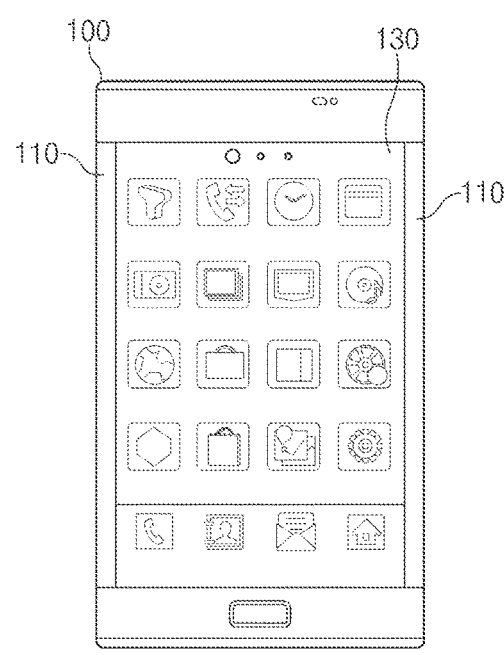
FIGS. 15A and 15B are diagrams illustrating a feature of displaying hidden icons, which are relevant to privacy of a user, in a same row with a fingerprint authentication position by fingerprint authentication of a fingerprint sensor placed at both sides of an electronic device according to various embodiments of the present disclosure.
Figure 15B:
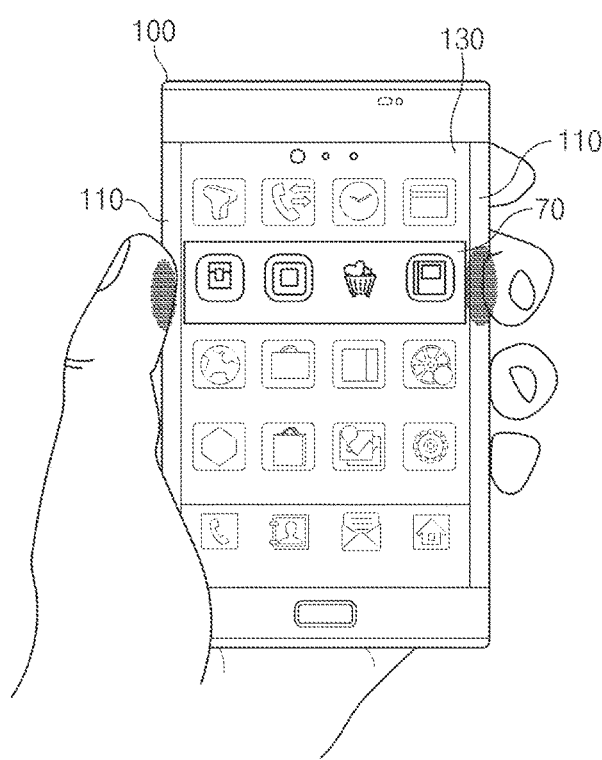

FIGS. 15A and 15B are diagrams illustrating a feature of displaying hidden icons, which are relevant to privacy of a user, in a same row with a fingerprint authentication position by fingerprint authentication of a fingerprint sensor placed at both sides of an electronic device according to various embodiments of the present disclosure.

Referring to FIGS. 15A and 15B, an electronic device 100 according to an embodiment of the present disclosure is illustrated, where the electronic device 100 may be designed to place at least two fingerprint sensors 110 at both sides of the electronic device 100. A side part of the electronic device 100 may include a curve. As shown in FIG. 15A, a touch screen 130 may locate at a front part of the electronic device 100 and display an icon of an application.

Referring to FIGS. 15A and 15B, if a user places at least two fingerprints on a sensing area of both sides of the electronic device 100, the electronic device 100 may perform fingerprint recognition in each of the both-sided fingerprint sensors 110. If fingerprint authentication is accomplished for the two fingerprints, the electronic device 100 may perform a predetermined function relevant to security requirement or user privacy.

If at least two fingerprints are authenticated at a same time, a predetermined function with a very high security level may be performed. For example, the processor 120, as illustrated in FIG. 3, may operate to approve a financial service. Additionally, the processor 120 may display a hidden icon on the touch screen 130, as illustrated in FIG. 15B. The hidden icon, as a kind of icon which is expressed, but normally disappearing, on a screen if authentication is performed for at least two fingerprints, may be a secret album or folder involved in privacy of a user, or a financial business icon needing security.

In this manner, the electronic device 100 may operate to perform a predetermined function with very high security level by authenticating at least two or more fingerprints at the same time.

If the fingerprint sensors 110 are placed at both sides of the electronic device 100, a user may be able to coincidentally operate the at least two fingerprint sensors 110, which are placed at both sides, while the user is gripping the electronic device 100. If the fingerprint sensors 110 coincidentally detect at least two fingerprints, the electronic device 100 may display at least one secret icon in a same row 70 with a position where a fingerprint is recognized.

Accordingly, a user may be able to easily conduct a fingerprint sensing operation in one time with at least two fingers which are gripping the electronic device 100.

The fingerprint sensors 110 of FIGS. 15A and 15B are illustrated as being located at both sides of a mobile terminal or the electronic device 100, whereas various embodiments of the present disclosure may not be restrictive hereto. Additionally, the fingerprint sensor 110 may be placed at a location, which includes a curve, such as a rear, front, upper, or lower side of a mobile terminal or the electronic device 100.

Figure 16:
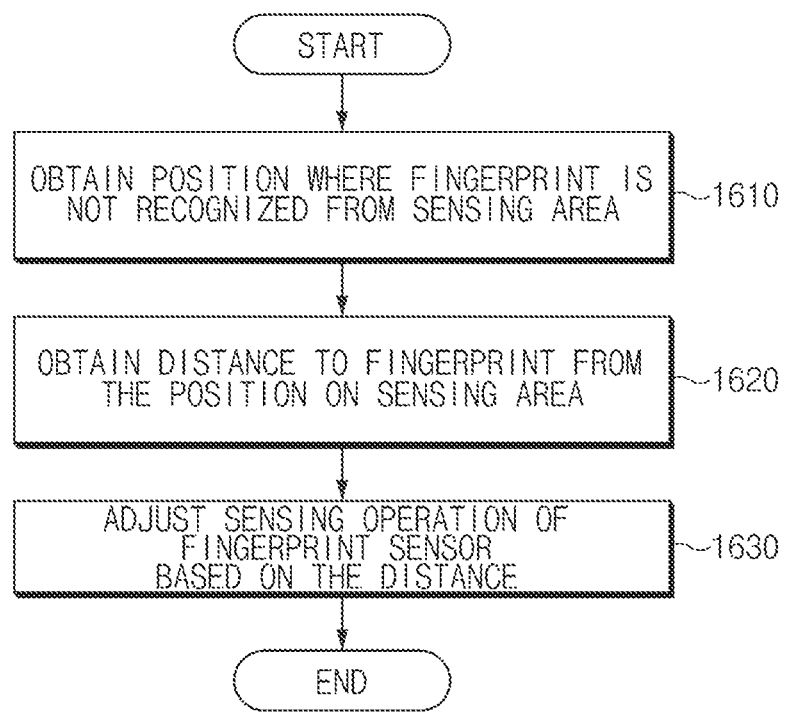
FIG. 16 is a flow chart showing a fingerprint recognition method according to an embodiment of the present disclosure.

FIG. 16 is a flow chart showing a fingerprint recognition method according to an embodiment of the present disclosure.

Referring to FIG. 16, a fingerprint recognition method includes operations that are processed by time variation in the electronic device 100 of FIGS. 3 to 15B. Therefore, it can be seen that the aforementioned descriptions relevant to the electronic device 100 shown in FIGS. 3 to 15B may be also applicable to the flow chart shown in FIG. 16 even though those descriptions will not be further duplicated hereinafter.

In operation 1610, the electronic device 100 may obtain a fingerprint-unrecognizable position from a sensing area of the fingerprint sensor 110, as illustrated in FIG. 3. The sensing area may be an area from which the fingerprint sensor 110 obtains a fingerprint input. If a fingerprint is placed on a sensing area of the fingerprint sensor 110, the fingerprint sensor 110 obtains a fingerprint input and then, based on the fingerprint input, recognize the fingerprint.

Although the fingerprint sensor 110 obtains a fingerprint input, the processor 120, as illustrated in FIG. 3, may not identify the fingerprint if the fingerprint input is so weakly present or indistinct.

In operation 1620, the electronic device 100 may obtain a distance to a fingerprint from a fingerprint-unrecognizable position on a sensing area.

According to an embodiment, the electronic device 100 may obtain a horizontal distance to a fingerprint-unrecognizable position from a reference line that is vertical to a sensing area, and thereafter, based on the horizontal distance, and a curvature angle and a curvature radius of a curve, obtain a distance between a fingerprint and the fingerprint-unrecognizable position. The reference line, the curvature angle, and the curvature radius may be preliminarily determined. Otherwise, the reference line, the curvature angle, and the curvature radius may be determined during fingerprint recognition.

In operation 1630, based on a distance between a fingerprint and a fingerprint-unrecognizable position, the electronic device 100 may adjust a sensing operation of the fingerprint sensor 110. For example, based on the distance, the processor 120 may control the fingerprint sensor 110 to adjust at least one of a signal value, which is detected by a receiver of the fingerprint sensor 110, and transmission power of a transmitter of the fingerprint sensor 110.

Figure 17:
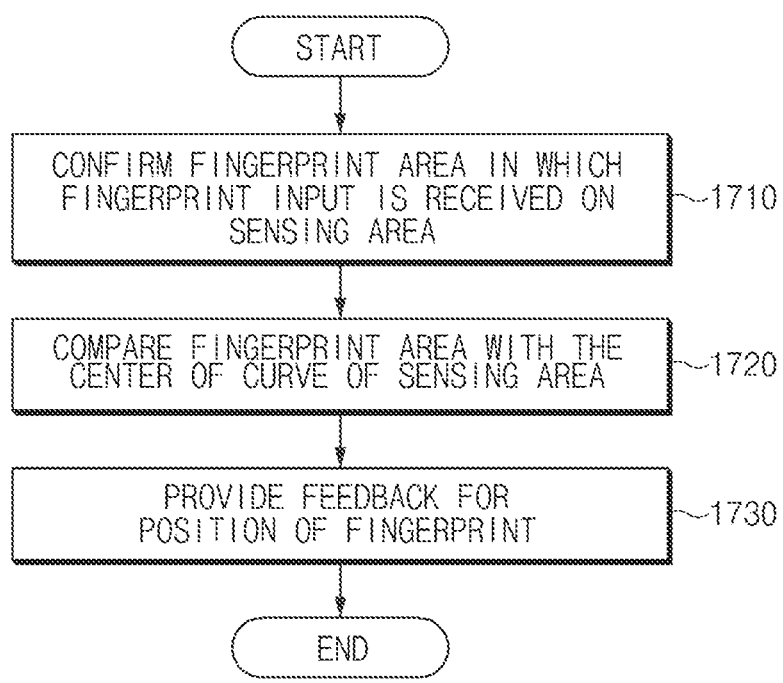
FIG. 17 is a flow chart showing a fingerprint recognition method according to an embodiment of the present disclosure.

FIG. 17 is a flow chart showing a fingerprint recognition method according to the present disclosure.

Referring to FIG. 17, a fingerprint recognition method is illustrated and includes operations that are processed by time variation in the electronic device 100 of FIGS. 3 to 15B. Therefore, it can be seen that the aforementioned descriptions relevant to the electronic device 100 shown in FIGS. 3 to 15B may be also applicable to the flow chart shown in FIG. 17, even though those descriptions will not be further duplicated hereinafter.

In operation 1710, the electronic device 100 may confirm a fingerprint area which is an area receiving a fingerprint input of a fingerprint on a sensing area. If a user places a fingerprint on a sensing area, the processor 120, as illustrated in FIG. 3, may confirm a fingerprint area on the sensing area.

In operation 1720, the electronic device 100 may compare a fingerprint area with the center of curve of a sensing area. An embodiment of the present disclosure is described as the electronic device 100 determines whether a fingerprint position is out of range from a sensing area on the center of curve. However, various embodiments of the present disclosure may not be restrictive hereto. The electronic device 100 may determine whether a fingerprint position is out of range from a sensing area on a predetermined location according to a pattern of curve of the sensing area.

In operation 1730, the electronic device 100 may provide a feedback, which is involved in a fingerprint position, to a flexible touch screen. According to an embodiment, if a fingerprint position is out of range from the center of curve of a sensing area, the electronic device 100 may display an out of range direction and degree of the fingerprint position from the sensing area in a predetermined form.

For example, the predetermined from may be a shadow 40, as illustrated in FIG. 11B, that is shaped in a fingerprint. However, various embodiments of the present disclosure may not be restrictive hereto. A predetermined form of displaying an out of range direction and degree of a fingerprint position from a sensing area may include any one of visible forms such as lighting, static image, dynamic image, and the like. Additionally, the processor 120 may provide sound or haptic data together with a predetermined pattern.

In the meantime, this fingerprint recognition method may be edited by a computer-executable program, and implemented in a generic digital computer which activates the program through a computer-readable recording medium. The computer-readable recording medium may include a magnetic recording medium (e.g., read-only memory (ROM), floppy disk, hard disk, etc.), an optical readout medium (e.g., compact disc ROM (CD-ROM), or digital versatile disc (DVD).

According to the aforementioned, it may be allowable to recognize a fingerprint from an electronic device even though an area where a fingerprint sensor detects the fingerprint. Therefore, it may be applicable for a fingerprint sensor to be without limits to space even in an electronic device including diverse patterns of curves. Additionally, it may be practicable to form a flexible display apparatus including a fingerprint.

By placing a fingerprint at a side of an electronic device, it may be permissible to raise spatial practicability. Additionally, a user may be able to handle fingerprint authentication while griping an electronic device.

Additionally, by utilizing a flexible touch screen and a side fingerprint sensor, it may be advantageous to providing a user-friendly environment in executing a security function and an application which use fingerprint authentication.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include ROM, Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include ROM, RAM, CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A fingerprint recognition method comprising:
   in response to receiving a fingerprint on a sensing area of a fingerprint sensor, identifying a first position of the sensing area that fails to sense the fingerprint;
   determining a distance from the first position to a reference point of the fingerprint sensor; and
   adjusting a sensing operation of the fingerprint sensor based on the distance.

2. The fingerprint recognition method of claim 1, wherein the fingerprint is unrecognizable due to a curve of the sensing area.

3. The fingerprint recognition method of claim 1, wherein the identifying of the first position comprises:
   receiving a signal associated with the fingerprint; and
   when the signal is lower than a threshold value, determining the first position associated with the signal.

4. The fingerprint recognition method of claim 1, further comprising a flexible touch screen configured to detect a touch input, and
   wherein the fingerprint sensor is disposed in the flexible touch screen.

5. The fingerprint recognition method of claim 1, wherein the identifying of the first position comprises:
   obtaining a fingerprint image for the fingerprint by the fingerprint sensor; and
   identifying the first position based on at least one of a resolution, a contrast, and a quality of the fingerprint image.

6. The fingerprint recognition method of claim 1, further comprising:
   determining a horizontal distance to the first position from a vertical reference line associated with the reference point; and
   determining the distance based on a curvature angle, a curvature radius of a curve from the vertical reference line to the first position, and the horizontal distance.

7. The fingerprint recognition method of claim 6, further comprising:
   determining the vertical reference line based on at least one of an input signal of the fingerprint sensor, a touch input through the fingerprint sensor, and a fingerprint image that is obtained from the fingerprint sensor; and
   determining the curvature radius and the curvature angle based on the vertical reference line.

8. The fingerprint recognition method of claim 6, wherein the vertical reference line, the curvature radius, and the curvature angle are determined based on a pattern of a curve of the sensing area.

9. The fingerprint recognition method of claim 1, wherein the adjusting of the sensing operation comprises:
   adjusting, based on the distance, at least one of a gain of a receiver of the fingerprint sensor and a transmission power of a transmitter of the fingerprint sensor.

10. The fingerprint recognition method of claim 1, further comprising:
    identifying a first area of the sensing area that fails to sense the fingerprint; and
    determining a gain of a receiver of the fingerprint sensor in the first area or determining a transmission power of a transmitter in the first area.

11. The fingerprint recognition method of claim 1, further comprising:
    identifying a fingerprint area associated with the fingerprint;
    comparing the fingerprint area with a center of the sensing area to determine if the fingerprint is outside of a fingerprint sensing boundary; and
    providing, based on a result of the comparing of the fingerprint area, a feedback for a location of the fingerprint.

12. The fingerprint recognition method of claim 11, wherein the providing of the feedback comprises:
    if the fingerprint is outside of the fingerprint sensing boundary, displaying information to place a subsequent fingerprint inside of the fingerprint sensing boundary.

13. The fingerprint recognition method of claim 12, wherein information corresponds to a shadow shaped as a fingerprint.

14. A non-transitory computer-readable storage medium storing instructions that, when executed, cause at least one processor to perform the method of claim 1.

15. An electronic device comprising: a fingerprint sensor configured to receive a fingerprint on a sensing area: and a processor configured to:
    in response to receiving the fingerprint on the sensing area, identify a first position of the sensing area that fails to sense the fingerprint, determine a distance from the first position to a reference point of the fingerprint sensor, and adjust a sensing operation of the fingerprint sensor based on the distance.

16. The electronic device of claim 15, wherein the processor is further configured to:

receive a signal associated with the fingerprint, and when the signal is lower than a threshold value, determine the first position associated with the signal.

17. The electronic device of claim 15, wherein the processor is further configured to:

obtain a fingerprint image for the fingerprint by sensing the fingerprint using the fingerprint sensor; and determine the first position from the fingerprint image based on at least one of a resolution, a contrast, and a quality of the fingerprint image.

18. The electronic device of claim 15, wherein the electronic device further comprises a flexible touch screen configured to detect a touch input, and wherein the fingerprint sensor is included in the flexible touch screen.

19. The electronic device of claim 18, wherein the flexible touch screen is configured to detect the touch input from the fingerprint in the sensing area, and wherein the processor is further configured to obtain the first position based on the touch input.

20. The electronic device of claim 15, wherein the electronic device further comprises a flexible touch screen configured to detect a touch input, wherein the fingerprint sensor is located at a side of the electronic device, wherein the flexible touch screen is located at a front part of the electronic device and is configured to display an icon of at least one application, which is executed by fingerprint authentication, in a row, and wherein the processor is further configured to execute, if the fingerprint is authenticated by the fingerprint sensor, an application that is in a row associated with the fingerprint.

21. The electronic device of claim 15, wherein the fingerprint sensor includes sensing electrodes comprised of at least one of a receiver and a transmitter, and wherein the processor is further configured to adjust at least one of a gain of the receiver and a transmission power of the transmitter.

* * * * *